United States Patent
Casas et al.

(10) Patent No.: US 12,205,004 B2
(45) Date of Patent: Jan. 21, 2025

(54) SYSTEMS AND METHODS FOR TRAINING PROBABILISTIC OBJECT MOTION PREDICTION MODELS USING NON-DIFFERENTIABLE PRIOR KNOWLEDGE

(71) Applicant: Aurora Operations, Inc., Pittsburgh, PA (US)

(72) Inventors: Sergio Casas, Toronto (CA); Cole Christian Gulino, Pittsburgh, PA (US); Shun Da Suo, Toronto (CA); Raquel Urtasun, Toronto (CA)

(73) Assignee: AURORA OPERATIONS, INC., Pittsburgh, PA (US)

( * ) Notice: Subject to any disclaimer, the term of this patent is extended or adjusted under 35 U.S.C. 154(b) by 0 days.

(21) Appl. No.: 18/495,434

(22) Filed: Oct. 26, 2023

(65) Prior Publication Data
US 2024/0054407 A1 Feb. 15, 2024

Related U.S. Application Data

(63) Continuation of application No. 17/150,798, filed on Jan. 15, 2021, now Pat. No. 11,836,585.
(Continued)

(51) Int. Cl.
*G06N 20/00* (2019.01)
*G05B 13/02* (2006.01)
(Continued)

(52) U.S. Cl.
CPC ......... *G06N 20/00* (2019.01); *G05B 13/0265* (2013.01); *G05D 1/0088* (2013.01); *G06N 7/01* (2023.01)

(58) Field of Classification Search
CPC ...... G06N 20/00; G06N 7/01; G05B 13/0265; G05D 1/0088; G05D 2201/0213
(Continued)

(56) References Cited

U.S. PATENT DOCUMENTS

| | | | |
|---|---|---|---|
| 2018/0032082 A1* | 2/2018 | Shalev-Shwartz | ............................ G01C 21/3453 |
| 2019/0049987 A1* | 2/2019 | Djuric | ...................... G06N 3/08 |

(Continued)

OTHER PUBLICATIONS

Alahi et al, "Social LSTM: Human Trajectory Prediction in Crowded Spaces," Conference on Computer Vision and Pattern Recognition, Jun. 26-Jul. 1, 2016, Las Vegas, Nevada, United States, 11 pages.
(Continued)

*Primary Examiner* — Hung Q Nguyen
*Assistant Examiner* — Anthony Donald Taylor, Jr.

(57) ABSTRACT

The present disclosure provides systems and methods for training probabilistic object motion prediction models using non-differentiable representations of prior knowledge. As one example, object motion prediction models can be used by autonomous vehicles to probabilistically predict the future location(s) of observed objects (e.g., other vehicles, bicyclists, pedestrians, etc.). For example, such models can output a probability distribution that provides a distribution of probabilities for the future location(s) of each object at one or more future times. Aspects of the present disclosure enable these models to be trained using non-differentiable prior knowledge about motion of objects within the autonomous vehicle's environment such as, for example, prior knowledge about lane or road geometry or topology and/or traffic information such as current traffic control states (e.g., traffic light status).

20 Claims, 6 Drawing Sheets

Related U.S. Application Data

(60) Provisional application No. 63/123,251, filed on Dec. 9, 2020, provisional application No. 62/984,034, filed on Mar. 2, 2020.

(51) Int. Cl.
*G05D 1/00* (2006.01)
*G06N 7/01* (2023.01)

(58) Field of Classification Search
USPC .......................................................... 706/12
See application file for complete search history.

(56) References Cited

U.S. PATENT DOCUMENTS

2019/0369637 A1* 12/2019 Shalev-Shwartz ..... G06V 20/56
2020/0090042 A1* 3/2020 Wayne ................... G06N 3/045

OTHER PUBLICATIONS

Bansal et al, "ChauffeurNet: Learning to Drive by Imitating the Best and Synthesizing the Worst", arXiv:1812.03079v1, Dec. 7, 2018, 20 pages.
Bishop, "Mixture Density Networks," Neural Computing Research Group, Department of Computer Science and Applied Mathematics 1994, 26 pages.
Bishop, "Pattern Recognition and Machine Learning," springer, 2006.
Caesar et al, "nuScenes: A Multimodal Dataset for Autonomous Driving," arXiv:1903.11027v5, May 5, 2020, 16 pages.
Casas et al, "IntentNet: Learning to Predict Intention from Raw Sensor Data," Conference on Robot Learning, Oct. 29-31, 2018, Zurich, Switzerland, 10 pages.
Casas et al, "SpAGNN: Spatially-Aware Graph Neural Networks for Relational Behavior Forecasting from Sensor Data," arXiv:1910.08233v1, Oct. 18, 2019, 11 pages.
Chai et al, "MultiPath: Multiple Probabilistic Anchor Trajectory Hypotheses for Behavior Prediction," arXiv:1910.05449v1, Oct. 12, 2019, 14 pages.
Chang et al, "Argoverse: 3D Tracking and Forecasting with Rich Maps," arXiv:1911.02620v1, Nov. 6, 2019, 18 page.
Cui et al, "Multimodal Trajectory Predictions for Autonomous Driving Using Deep Convolutional Networks," arXiv:1809.10732v2, Mar. 1, 2019, 7 pages.
Deo et al, "Convolutional Social Pooling for Vehicle Trajectory Prediction," arXiv:1805.06771v1, May 15 2018, 9 pages.
Jain et al, "Discrete Residual Flow for Probabilistic Pedestrian Behavior Prediction," arXiv:1910.08041v1, Oct. 17, 2019, 13 pages.
Kingma et al, "Auto-Encoding Variational Bayes," arXiv:1312.6114v10, May 1, 2014, 14 pages.
Li et al, "Vehicle Detection from 3D Lidar Using Fully Convolutional Network," arXiv:1608.07916v1, Aug. 29, 2016, 8 pages.
Luo et al, "Fast and Furious: Real Time End-to-End 3D Detection, Tracking and Motion Forecasting with a Single Convolutional Net," arXiv:2012.12395V1. Dec. 22, 2020, 9 pages.
Refaat et al, "Agent Prioritization for Autonomous Navigation," arXiv:1909.08792v1, Sep. 19, 2019, 8 pages.
Rhinchart et al, "PRECOG: PREdiction Conditioned on Goals in Visual Multi-Agent Settings," arXivarXiv:1905.01296v3, Sep. 3, 2019, 24 pages.
Rhinehart et al, "R2P2: A ReparameteRized Policy for Diverse, Precise Generative Path Forecasting," European Conference on Computer Vision, Sep. 8-14, 2018, Munich, Germany, 17 pages.
Shi et al, "Part-A^2 Net: 3D Part-Aware and Aggregation Neural Network for Object Detection from Point Cloud," 13 pages.
Sadat et al, "Jointly Learnable Behavior and Trajectory Planning for Self-Driving Vehicles," arXiv:1910.04586v1, Oct. 10, 2019, 8 pages.
Tang et al, "Multiple Futures Prediction," arXiv:1911.00997v2, Dec. 6, 2019, 17 pages.
Williams, "Simple Statistical Gradient-Following Algorithms for Connectionist Reinforcement Learning," Machine Learning, vol. 8, No. 3-4, 1992, pp. 5-32.
Yang et al, "PIXOR: Real-Time 3D Object Detection from Point clouds," arXiv:1902.06326v3, Mar. 2, 2019, 10 pages.

* cited by examiner

SYSTEMS AND METHODS FOR TRAINING PROBABILISTIC OBJECT MOTION PREDICTION MODELS USING NON-DIFFERENTIABLE PRIOR KNOWLEDGE

PRIORITY CLAIM

This application is a continuation of U.S. patent application Ser. No. 17/150,798, filed Jan. 15, 2021, which claims priority to and the benefit of each of U.S. Provisional Patent Application No. 62/984,034, filed Mar. 2, 2020 and U.S. Provisional Patent Application No. 63/123,251, filed Dec. 9, 2020. Applicant claims priority to and the benefit of each of such applications and incorporates all such applications herein by reference in its entirety.

FIELD

The present disclosure relates generally to machine learning. More particularly, the present disclosure relates to systems and methods for training probabilistic object motion prediction models such as, for example, objection motion prediction models employed by an autonomous vehicle prediction system using non-differentiable prior knowledge such as, for example, prior knowledge about lane geometry or topology within an environment in which the object is observed.

BACKGROUND

An autonomous vehicle can be capable of sensing its environment and navigating with little to no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can navigate through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to computer-implemented method for training probabilistic object motion prediction models using non-differentiable prior knowledge. The method includes obtaining, by a computing system comprising one or more computing devices, sensor data descriptive of an environment comprising an object. The method includes processing, by the computing system, the sensor data with a machine-learned object motion prediction model to obtain a predicted location probability distribution for a future location of the object at one or more future times. The method includes sampling, by the computing system, a plurality of sample trajectories from the predicted location probability distribution for the object. The method includes evaluating, by the computing system and for each sample trajectory, a non-differentiable prior knowledge reward function that encodes prior knowledge about motion of the object to obtain a respective reward value for the sample trajectory. The method includes determining, by the computing system, an approximate gradient of an expected loss based at least in part on the plurality of reward values respectively determined for the plurality of sample trajectories. The method includes modifying, by the computing system, one or more values of one or more parameters of the machine-learned object motion prediction model based at least in part on the approximate gradient of the expected loss.

Another example aspect of the present disclosure is directed to computing system that includes one or more processors; and one or more non-transitory computer-readable media that collectively store instructions that, when executed by the one or more processors, cause the computing system to perform operations. The operations include obtaining, by the computing system, sensor data descriptive of an environment comprising an object. The operations include processing, by the computing system, the sensor data with a machine-learned object motion prediction model to obtain a predicted location probability distribution for a future location of the object at one or more future times. The operations include sampling, by the computing system, a plurality of sample trajectories from the predicted location probability distribution for the object. The operations include evaluating, by the computing system and for each sample trajectory, a non-differentiable prior knowledge reward function that encodes prior knowledge about motion of the object to obtain a respective reward value for the sample trajectory. The operations include determining, by the computing system, an approximate gradient of an expected loss based at least in part on the plurality of reward values respectively determined for the plurality of sample trajectories. The operations include modifying, by the computing system, one or more values of one or more parameters of the machine-learned object motion prediction model based at least in part on the approximate gradient of the expected loss.

Another example aspect of the present disclosure is directed to an autonomous vehicle computing system that includes one or more processors and one or more non-transitory computer-readable media that collectively store a machine-learned object motion prediction model configured to process sensor data descriptive of an environment comprising an object to generate a predicted location probability distribution for a future location of the object at one or more future times. The machine-learned object motion prediction model has been trained by performing a REINFORCE gradient estimation technique to determine an approximate gradient of an expected loss that is a function of a non-differentiable prior knowledge reward function that encodes prior knowledge about motion of the object. The one or more non-transitory computer-readable media collectively store instructions that, when executed by the one or more processors, cause the computing system to perform operations. The operations include obtaining new sensor data for a new environment comprising a new object. The operations include processing the new sensor data with the machine-learned object motion prediction model to obtain a new predicted location probability distribution for a future location of the new object at one or more future times. The operations include controlling motion of an autonomous vehicle based at least in part on the new predicted location probability distribution for the future location of the new object.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Overview

Figures 1A, 1B:
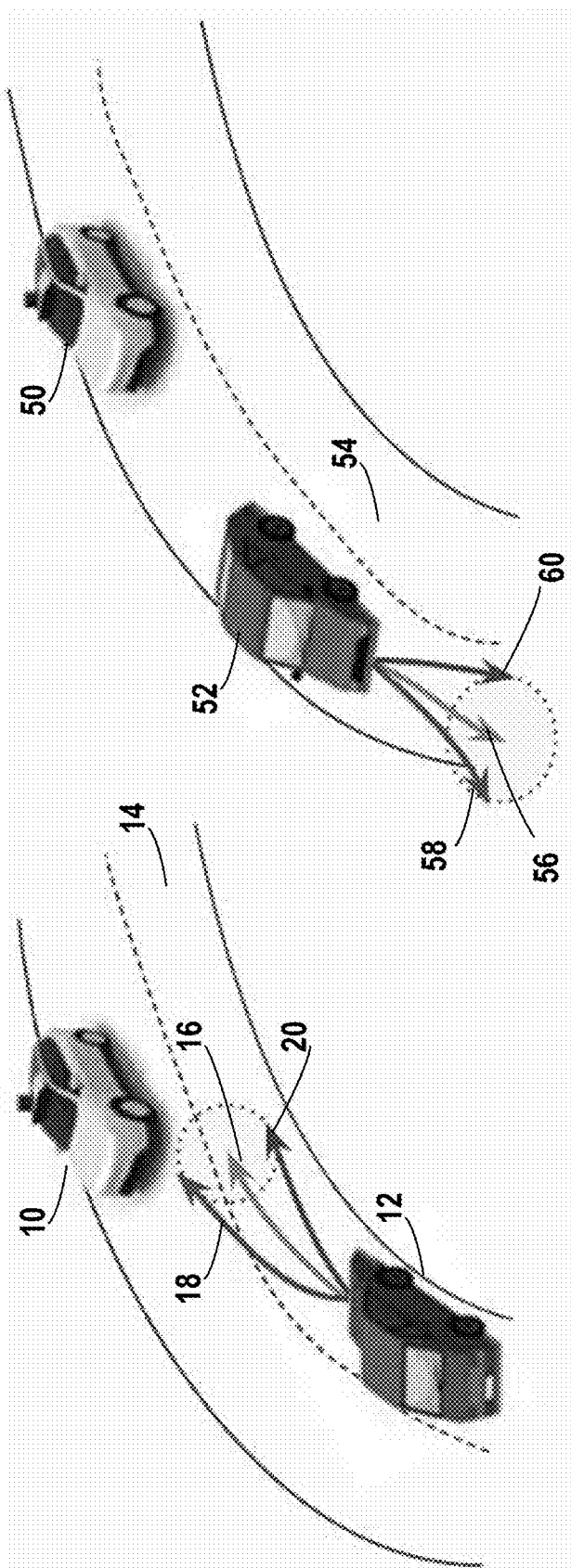
FIGS. 1A and 1B depicts graphical diagrams of problems caused by use of a symmetric loss function that does not incorporate prior knowledge about road geometry.

Example aspects of the present disclosure are directed to systems and methods for training probabilistic object motion prediction models using non-differentiable representations of prior knowledge. As one example, object motion prediction models can be used by autonomous vehicles to probabilistically predict the future location(s) of observed objects (e.g., other vehicles, bicyclists, pedestrians, etc.). For example, such models can output a probability distribution that provides a distribution of probabilities for the future location(s) of each object at one or more future times. Aspects of the present disclosure enable these models to be trained using non-differentiable prior knowledge about motion of objects within the autonomous vehicle's environment such as, for example, prior knowledge about lane or road geometry or topology and/or traffic information such as current traffic control states (e.g., traffic light status).

In particular, roads or other transportation networks typically have well-defined geometries or topologies and well-defined traffic rules. While these aspects have been exploited in motion planning methods to produce control maneuvers for autonomous vehicles that adhere to driving norms, past work has failed to utilize these priors in perception and motion forecasting methods (e.g., techniques for predicting future location(s) of object(s) observed by an autonomous vehicles). The present disclosure provides systems and methods which enable the incorporation of these or other structured priors as or within a loss function which, for example as opposed to crafting hard rules about object behavior, allows a probabilistic object motion prediction model to handle illegal and unexpected maneuvers when those happen in the real world. Thus, aspects of the present disclosure provide improved probabilistic characterization of the possible future unrolls of a scene, which ultimately enables autonomous vehicle motion planning with improved safety and rider comfort.

Specifically, one example aspect of the present disclosure provides an example framework that leverages gradient estimation techniques such as, for example, the REINFORCE technique to incorporate non-differentiable priors over sample motion forecasts from a probabilistic model, thus training the whole distribution output by the model. The proposed framework is effective on different types of training data, including real-world self-driving datasets containing complex road topologies and multi-agent interactions. The resulting motion forecasts produced by the trained model not only exhibit a better map understanding but also result in safer motion plans from the autonomous vehicle.

More particularly, a core component of every autonomous vehicle is its ability to perceive the world (including dynamic objects) and to forecast how the future might unroll. The latter is important in order to plan a safe maneuver. In recent years there has been incredible progress in perception systems. However, many challenges still remain in providing motion forecasts that are simultaneously diverse and precise. That is, having the ability to cover all the modes of the data distribution while generating bad trajectories only very rarely.

Roads in modern cities have well defined geometries or topologies as well as traffic rules. The vast majority of actors in the scene will adhere to this structure such as, for example, driving close to the middle of their lane, respecting stop signs or obeying yielding laws. These agents will also most likely act in a socially acceptable manner, avoiding collisions with other traffic participants. Despite this fact, most perception and motion forecasting systems are trained to be as close as possible to ground truth trajectories, including existing techniques which employ symmetric loss functions that do not take this structure into account. As one example, Euclidean distance between a predicted object trajectory and a ground truth trajectory is a common choice for motion forecasting. Thus, prior approaches might treat a trajectory that deviates 10 degrees leftward from the ground truth as equal to a trajectory that devices 10 degrees rightward from the ground truth. However, if one of these trajectories observes traffic laws while the other does not, treating them equally fails to capitalize upon strong prior knowledge that most actors observe traffic laws.

Failure to incorporate prior knowledge in such fashion (e.g., by reliance upon pure Euclidean measures of distance) can cause uncomfortable rides for the autonomous vehicle. Specifically, this approach can result in a large number of false positive motion forecasts of the observed object coming into the lane of the ego-vehicle (e.g., the autonomous vehicle making and acting upon the predictions). These false positives can cause the ego-vehicle to exhibit uncomfortable sudden braking operations. Even worse, false positive predictions can cause drastic steering changes to avoid an imminent collision, potentially causing another collision as a by-product.

FIGS. 1A and 1B shows example visualizations of the problems raised by naive symmetric loss functions that do not take prior knowledge about road geometry into account. In particular, in FIG. 1A, an ego vehicle 10 is observing another vehicle 12 on a roadway 14. For the vehicle 12, trajectory 16 corresponds to a ground truth that is observed in fact. If a symmetric loss function is used, trajectory predictions 18 and 20 have the same L2 loss relative to the ground truth trajectory 16. However, trajectory prediction 18 would cause a harmful event while prediction 20 would not. Specifically, if trajectory 18 is predicted then the ego vehicle 10 may respond by swerving out of the corresponding lane. However, if trajectory 20 is predicted then no issue is caused for the ego vehicle 10. Thus, predictions 18 and 20 should not receive the same loss.

Similarly, in FIG. 1B, an ego vehicle 50 is observing another vehicle 52 on a roadway 54. For the vehicle 52, trajectory 56 corresponds to a ground truth that is observed in fact. If a symmetric loss function is used, trajectory predictions 58 and 60 have the same L2 loss relative to the ground truth trajectory 56. However, trajectory prediction 58 would cause a harmful event while prediction 60 would not. Specifically, if trajectory 58 is predicted, then the ego vehicle 50 could potentially accelerate and collide with the vehicle 52. However, if trajectory 60 is predicted then no issue is caused for the ego vehicle 50. Thus, predictions 58 and 60 should not receive the same loss.

One alternative approach to completely disregarding prior knowledge is to hard code the aforementioned intuitions into the motion forecasting model (e.g., by naively rejecting predicted object trajectories which violate traffic rules). However, this approach is not resilient to non-compliant behavior from other actors and map failures, producing possibly dangerous situations. In contrast to these existing techniques, the present disclosure leverages loss functions that encourage the perception and prediction system of the autonomous vehicle to only violate these constraints when they happen in reality.

Incorporating prior knowledge in the loss function when the perception and prediction systems are deterministic can be easily done. However, deterministic systems provide less safe outcomes, as they can be catastrophic when predicting the wrong actor intention (e.g., crossing the street vs waiting, yielding vs not).

In addition, in order to plan a safe maneuver, coverage of the possible future scenarios is required, along with information about the likelihood of each possible future such that the motion planner can choose the trajectory with the lowest expected cost. The Gaussian distribution and mixtures thereof have been widely used to represent uncertainty over spatial locations. However, training probabilistic models to match the negative log likelihood of the data encourages the model to produce distributions with high recall in order to avoid the big penalty associated with low-density areas in the distribution. As a consequence many unrealistic samples are generated, sacrificing the precision of the model.

According to an aspect of the present disclosure, systems and methods are provided which make explicit use of prior knowledge about the geometry or topology of the environment as well as the traffic rules, thereby providing more precise distributions over future outcomes while preserving recall. However, this is challenging as these priors are typically non-differentiable and thus not directly amenable to gradient based optimization. For instance, the fact that humans tend to follow the traffic rules can be better described as a discrete (follow/not follow) action. To this end, the present disclosure proposes a flexible framework to incorporate non-differentiable prior knowledge as a loss and exploit gradient estimation techniques such as, for example, the REINFORCE gradient estimator. See R. J. Williams, "Simple statistical gradient-following algorithms for connectionist reinforcement learning," Machine learning, vol. 8, no. 3-4, pp. 229-256, 1992.

Thus, the present disclosure provides a novel framework to incorporate prior knowledge explicitly into probabilistic motion forecasting systems. Importantly the proposed approach still allows predicting non-compliant behavior that does not follow traffic rules in the rare event that this happens. The proposed methods are general and can be applied to any model that can generate trajectory samples y and evaluate their marginal likelihood p (y|x) efficiently, where x is the observations of the environment (e.g., as represented by collected sensor data). In particular, given a traffic scene, humans have rich prior knowledge over how the traffic participants might behave. The systems and methods of the present disclosure directly use this prior knowledge as supervision when learning a distribution over future trajectories that is both diverse and precise.

Towards this goal, example systems and methods encode this prior knowledge as a deterministic reward function r(y,x). The prior knowledge loss can then be defined as the negative expected reward over samples from the future trajectory distribution. Applying the loss directly to the point estimate of the means is typically not sufficient since the goal is to learn an accurate characterization of the full distribution for safe motion planning. The goal is then to learn a stochastic policy or model (parameterized by θ) that maximizes the expected reward $\mathcal{R}$: Thus:

$$\mathcal{L}_{prior}(x;\theta) = \mathbb{E}_{y \sim p_\theta(y|x)}[-r(y,x)] = \int -p_\theta(y|x) r(y,x) dy$$

Most priors are non-differentiable and cannot be easily relaxed (e.g., a motion forecast following the traffic rules or not) Thus, example implementations of the present disclosure leverage policy gradient algorithms, which do not assume differentiability of the reward function r and allow optimization without making any approximations. In particular, some example implementations exploit the REINFORCE algorithm, which only requires the policy to be differentiable, and provides efficient sampling and likelihood evaluation.

In this case, the gradient of the expected loss can be computed as:

$$\nabla \mathcal{L}_{prior}(x;\theta) = \mathbb{E}_{y \sim \pi_\theta(y)}[-\nabla \log p_\theta(y|x) r(y,x)]$$

The expectation can then be approximated by drawing samples from the predicted distribution as follows $$\nabla \mathcal{L}_{prior}(x;\theta) \approx \frac{1}{S} \sum_i^S \sum_t^T -\nabla \log p_\theta(y_t^i|x) r(y_t^i, x)$$

with S the number of samples. Although this Monte Carlo estimation is unbiased, it has typically high variance. However, example experiments have shown that this does not pose a problem when using a policy that has an efficient sampling mechanism, since a large number of samples can be efficiently drawn.

In practice, some example proposed rewards functions consider prior knowledge about the fact that drivers tend to follow their reachable lanes (e.g., based on the lane-graph or road topology), as well as to respect traffic lights. Furthermore, in some implementations, knowledge about the autonomous vehicle's desired route can be leveraged to focus more on the forecasting of the most relevant actors. In particular, missing the prediction of an actor coming in conflict with the autonomous vehicle's route (false negatives) or predicting that an actor will cross in front of the autonomous vehicle when in reality it stops (false positives) are of greater importance than an actor 50 meters behind the autonomous vehicle, since these can create harmful events. In some implementations, an example final reward can be expressed as a simple linear combination of the two rewards describe above:

$$r(y,x)=r_{reach}(y,x)+r_{route}(y,x)$$

In particular, some example implementations include a reward function that evaluates whether a sample trajectory generated for an object (e.g., sampled from a predicted probability distribution for location(s) of the object at future time(s)) intersects with a reachable area for the object. For example, the reachable area can be defined by a set of one or more reachable lanes that are reachable from a current location of the object while observing traffic rules.

More particularly, human driving behavior is highly structured: in the majority of scenarios, drivers will follow the road topology and traffic rules. To leverage this informative prior, but not overly penalize non-compliant behavior, example implementations define a flexible traffic-rule informed loss that is conditioned on ground-truth behavior.

To this end, some example implementations leverage a lane-graph representation (or other map data or lane or road geometry or topology data) where the nodes encode lane segments and the edges represent relationships between lane segments such as neighborhood, predecessor, and successor (e.g., taking into account direction of traffic flow). This allows the computing system to define a set of reachable lanes or, more generally, a reachable "area" as reachable areas for pedestrians may include sidewalks, crosswalks, etc.

As such, one example reward function (e.g., a "reach loss") which can be formulated based on the reachable area for an object is as follows:

$$r_{reach}(y, x) = \begin{cases} r_d, & \text{if } y \in \text{reach } (b) \land y_{gt} \in \text{reach } (b_{gt}) \\ -r_d, & \text{if } y \notin \text{reach } (b) \land y_{gt} \in \text{reach } (b_{gt}) \\ 0, & \text{otherwise} \end{cases}$$

where $b_{gt}$ is the closest ground truth bounding box (e.g., in terms of intersection-over-union) to a detected bounding box b associated with the object.

Note that to be robust to noise in the lane graph and avoid penalizing non-compliant behaviors, some example implementations only apply the loss if the ground truth trajectory y gt falls within the binary mask designating the reachable area.

In some implementations, to define the reachable area for each actor in the scene, a computing system can capture or analyze lane divider infractions on the lane-graph. Lane dividers limit the set of legal high-level actions a vehicle can take in the road. As one example, lane changing over a solid line or taking over another vehicle by crossing a yellow double solid line into opposite traffic are not allowed. This prior can be incorporated by removing the edges of the lane graph that correspond to illegal maneuvers from the lane-graph. Encoding this prior helps the model predict less entropic distributions.

In some implementations, to define the reachable area for each actor in the scene, a computing system can capture or analyze traffic state violations such as traffic light violations. In particular, many interactions occur at intersections, some of them safety critical. Thus it is important to have accurate actor predictions at intersections, particularly differentiating stopping and going behaviors. To this end, example implementations leverage the traffic control states (e.g., green, red, yellow) to remove edges connecting lane segments that are currently governed by a red traffic light or otherwise not permitted to access given the current state.

Once the lane-graph has been processed by applying the aforementioned rules (e.g., lane divider plus traffic state), lane association can be performed to match each detected vehicle to a lane (or set of lanes when the vehicle overlaps with multiple ones for example during a lane change). Subsequently, a search (e.g., a depth first search) can be performed starting from the current lane, obtaining a set of reachable lanes, which can then be used to evaluate the reward function for each sample trajectory.

Figure 2B:
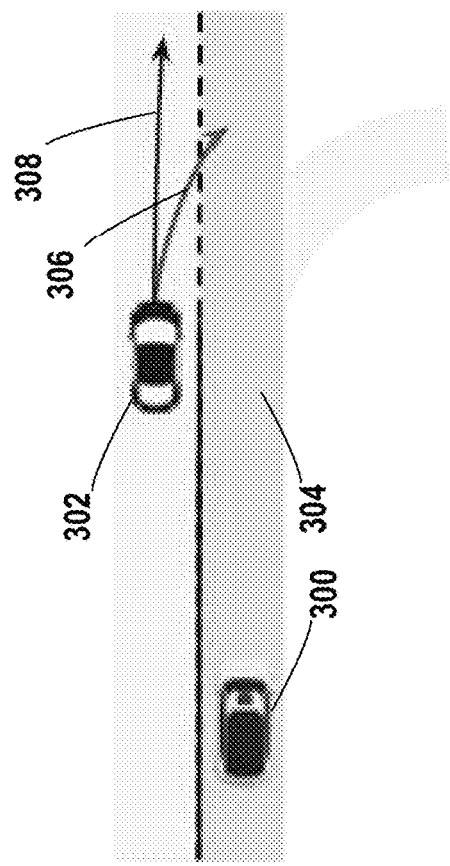
FIG. 2B depicts a graphical diagram of a route for an ego vehicle according to example embodiments of the present disclosure.
Figure 2A:
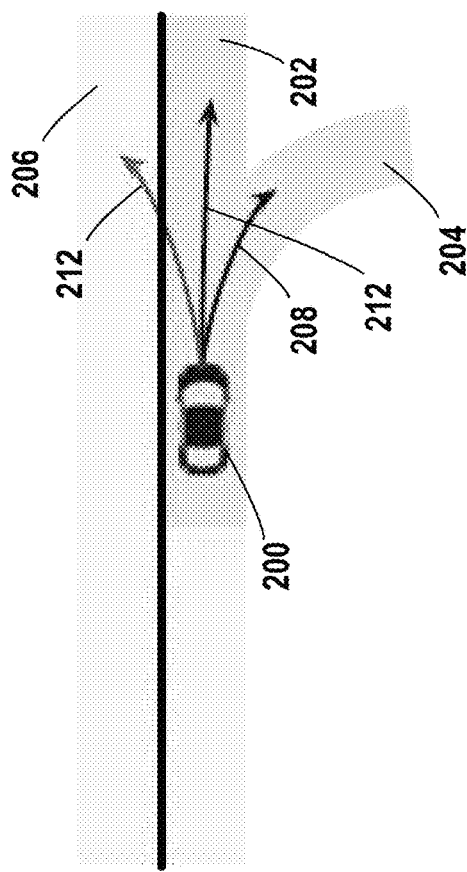
FIG. 2A depicts a graphical diagram of a set of reachable lanes according to example embodiments of the present disclosure.

As one example, FIG. 2A provides a visualization of an example set of reachable lanes for a vehicle 200. The set of reachable lanes is shown in darker coloration. Specifically, vehicle 200 is traveling in a first lane 202. A second lane 204 is reachable from lane 202 without violating any traffic rules. Thus, lane 204 is included in the set of reachable lanes. However, a third lane 206 cannot be reached from lane 202 without violating traffic rules (e.g., crossing over a solid line). Therefore, lane 206 may be excluded to from the set of reachable lanes. Predicted trajectories can be penalized based on whether or not they remain within in the set of reachable lanes. For example, predicted trajectories 208 and 210 may avoid penalization because they remain within the set of reachable lanes while predicted trajectory 212 may incur a reach loss as it exceeds the set of reachable lanes.

As another example, some example implementations include a reward function that evaluates whether the sample trajectory intersects with a route associated with an ego vehicle. In particular, it is more important to precisely characterize the motion of vehicles that might interact with the autonomous vehicle, rather than other traffic participants that do not influence its behavior. As such, the area of interest can be approximated with the autonomous vehicle's planned high-level route, which can, as one example, be defined as the union of all lane segments that the autonomous vehicle can travel on to reach a preset goal, given the lane-graph.

More concretely, in some example implementations, the horizon can be set to be equal to the prediction horizon (e.g., ~5 s), and the target lane can be generated by a high level route planner. This gives a safe approximation over its future possible locations, which can then be used to evaluate the reward function for each sample trajectory.

Specifically, positive trajectories can be defined as those with at least one waypoint falling within the autonomous vehicle's route, and negative otherwise. The reward function can be structured so that the trajectory predictions achieve high precision and high recall under this definition, taking into account if the ground-truth trajectory intersects the route (positive) or not (negative).

As one example, FIG. 2B illustrates an ego vehicle 300 which is near another vehicle 302. A high level route planner for the ego vehicle 300 may indicate that the ego vehicle 300 will continue straight in lane 304. For the other vehicle 302, a first predicted trajectory 306 may be a positive trajectory as it intersects the route of the ego vehicle 300; while a second predicted trajectory 308 may be a negative trajectory as it does not intersect the route of the ego vehicle 300.

More concretely, one example reward function (e.g., a "route loss") which can be formulated based on the route of the ego vehicle is as follows:

$$r_{route}(y, x) = \begin{cases} r_{tp} & \text{if } y \in \text{route} \wedge y_{gt} \in \text{route} \\ r_{fp} & \text{if } y \in \text{route} \wedge y_{gt} \notin \text{route} \\ r_{tn} & \text{if } y \notin \text{route} \wedge y_{gt} \notin \text{route} \\ r_{fn} & \text{if } y \notin \text{route} \wedge y_{gt} \in \text{route} \end{cases}$$

where different rewards are provided for true positive, false positive, true negative and false negative trajectory predictions since there is high imbalance in the data and they have different impact on the safety of the motion planner.

Another example aspect of the present disclosure is directed to a state-of-the-art perception and prediction model (e.g., to which the prior knowledge framework described herein can be applied). In particular, some example implementations exploit a combination of a backbone feature extraction and object detection network and graph propagation from SPAGNN (S. Casas, C. Gulino, R. Liao, and R. Urtasun, "Spatially-aware graph neural networks for relational behavior forecasting from sensor data," arXiv preprint arXiv: 1910.08233, 2019.), together with a mixture of Gaussians output parameterization (see, e.g., Y. Chai, B. Sapp, M. Bansal, and D. Anguelov, "Multipath: Multiple probabilistic anchor trajectory hypotheses for behavior prediction," arXiv preprint arXiv: 1910.05449, 2019.). In some implementations, this perception and prediction model can take a voxelized LiDAR point cloud and a raster map as input, extracts scene features using a backbone CNN, and applies Rotated Region of Interest Align to extract per-actor features. After that, a fully-connected graph can be used where the nodes correspond to traffic participants, and a series of graph-propagations can be performed to refine each actor's representation by aggregating features from their neighbors. Finally, a network such as a multi-layer perceptron can predict the parameters of a multimodal distribution over future trajectories by using a mixture of Gaussians for each actor:

$$p(y|x) = \sum_k \alpha_\psi^{(k)}(x) \prod_{t=1}^{T} N(\mu_t^{(k)}(x), \sigma_t^{(k)}(x))$$

In some implementations, the proposed models can be trained end-to-end using backpropagation and stochastic gradient descent. In particular, some implementations can perform training by minimizing a multi-objective loss containing a classification and regression terms for object detection, negative loglikelihood of the motion forecasts, as well as the prior informed non-differentiable loss described elsewhere herein.

The loss of each actor can be a weighted sum of the multiple objectives.

$$\mathcal{L} = \alpha \cdot \mathcal{L}_{det} + \beta \cdot \mathcal{L}_{nll} + \gamma \cdot \mathcal{L}_{pred\text{-}prior}$$

For the classification branch of the detection header (e.g., background vs vehicle) a binary cross entropy loss with hard negative mining can be employed ($\mathcal{L}_{cla}$). As one example, all positive examples can be selected from the ground-truth and 3 times as many negative examples from the rest of spatial locations. Regarding box fitting, a smooth L1 loss $\mathcal{L}_{reg}$ can be applied to each of the 5 parameters ($x_i$, $y_i$, $w_i$, $h_i$, $\varphi_i$) of the bounding boxes anchored to a positive example i.

$$\mathcal{L}_{det} = \mathcal{L}_{cla} + \lambda \cdot \mathcal{L}_{reg}$$

In some implementations, instead of directly optimizing the likelihood of the mixture model, a computing system can heuristically choose the closest matching mode and only apply prediction loss on that mode. This has been shown empirically to be a more stable training objective than optimizing the mixture likelihood directly. Thus some example implementations define $$L_{nll} = -\sum_k 1(k = \hat{k})\left[\log p(a^k|x) + \sum_t \log p(y_t^k|x, a^k)\right]$$

where $\hat{k} = \arg\min_k \text{dist}(y^k, \hat{y})$ is the mode whose mean is closest to the ground truth trajectory in Euclidean distance.

The proposed systems and methods provide a number of technical effects and benefits. As one example technical effect, the proposed framework allows the model to optimize for any prior knowledge on future trajectories, as long as drawing samples from the perception and prediction model and obtaining their likelihood can be done efficiently. In particular, the formulation can be applied to model how the vehicles interact with the map, encouraging the predictions to respect lane dividers and traffic lights. The proposed framework can also be exploited to make the motion forecasting module more planning aware by emphasizing the importance of high recall and high precision near the ego autonomous vehicle route.

As another example technical benefit, example experiments show that the proposed framework can improve the map understanding of state-of-the-art motion forecasting methods in very complex, partially observable urban environments. Importantly, the proposed approach achieves significant improvements in the precision of the trajectory distribution, while maintaining the recall. The improved object motion predictions also significantly impact downstream motion planning. In particular, including prior knowledge not only results in significantly more comfortable rides, but also in major safety improvements over the decisions taken by a state-of-the-art motion planner.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

With reference now to the Figures, example embodiments of the present disclosure will be discussed in further detail.

Example Systems

Figure 3:
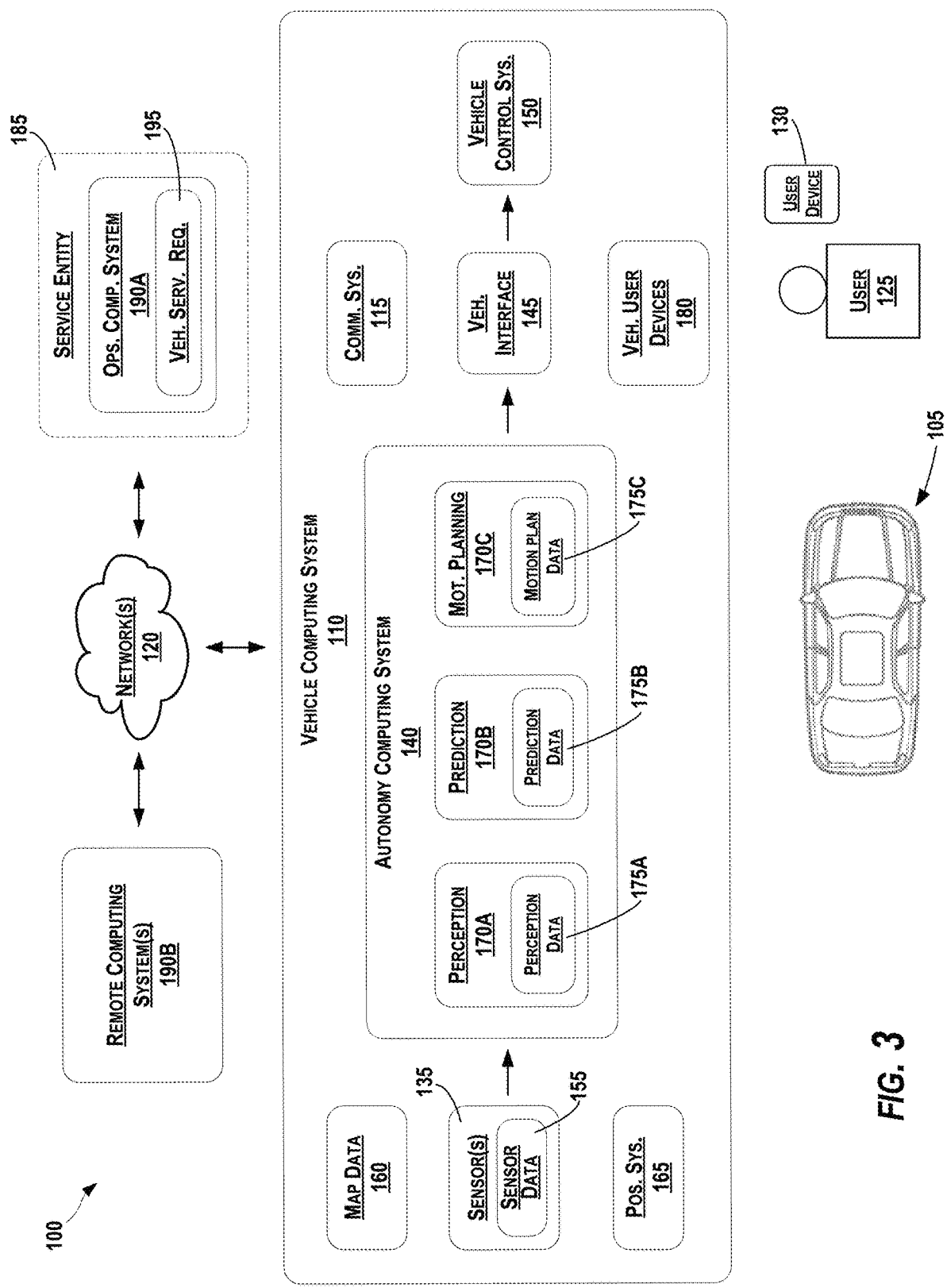
FIG. 3 depicts a block diagram of an example computing system according to example embodiments of the present disclosure.

FIG. 3 depicts a block diagram of an example system 100 for controlling and communicating with a vehicle according to example aspects of the present disclosure. As illustrated, FIG. 3 shows a system 100 that can include a vehicle 105 and a vehicle computing system 110 associated with the vehicle 105. The vehicle computing system 100 can be located onboard the vehicle 105 (e.g., it can be included on and/or within the vehicle 105).

The vehicle 105 incorporating the vehicle computing system 100 can be various types of vehicles. For instance, the vehicle 105 can be an autonomous vehicle. The vehicle 105 can be a ground-based autonomous vehicle (e.g., car, truck, bus, etc.). The vehicle 105 can be an air-based autonomous vehicle (e.g., airplane, helicopter, vertical take-off and lift (VTOL) aircraft, etc.). The vehicle 105 can be a lightweight electric vehicle (e.g., bicycle, scooter, etc.). The vehicle 105 can be another type of vehicles (e.g., watercraft, etc.). The vehicle 105 can drive, navigate, operate, etc. with minimal and/or no interaction from a human operator (e.g., driver, pilot, etc.). In some implementations, a human operator can be omitted from the vehicle 105 (and/or also omitted from remote control of the vehicle 105). In some implementations, a human operator can be included in the vehicle 105.

The vehicle 105 can be configured to operate in a plurality of operating modes. The vehicle 105 can be configured to operate in a fully autonomous (e.g., self-driving) operating mode in which the vehicle 105 is controllable without user input (e.g., can drive and navigate with no input from a human operator present in the vehicle 105 and/or remote from the vehicle 105). The vehicle 105 can operate in a semi-autonomous operating mode in which the vehicle 105 can operate with some input from a human operator present in the vehicle 105 (and/or a human operator that is remote from the vehicle 105). The vehicle 105 can enter into a manual operating mode in which the vehicle 105 is fully controllable by a human operator (e.g., human driver, pilot, etc.) and can be prohibited and/or disabled (e.g., temporary, permanently, etc.) from performing autonomous navigation (e.g., autonomous driving, flying, etc.). The vehicle 105 can be configured to operate in other modes such as, for example, park and/or sleep modes (e.g., for use between tasks/actions such as waiting to provide a vehicle service, recharging, etc.). In some implementations, the vehicle 105 can implement vehicle operating assistance technology (e.g., collision mitigation system, power assist steering, etc.), for example, to help assist the human operator of the vehicle 105 (e.g., while in a manual mode, etc.).

To help maintain and switch between operating modes, the vehicle computing system 110 can store data indicative of the operating modes of the vehicle 105 in a memory onboard the vehicle 105. For example, the operating modes can be defined by an operating mode data structure (e.g., rule, list, table, etc.) that indicates one or more operating parameters for the vehicle 105, while in the particular operating mode. For example, an operating mode data structure can indicate that the vehicle 105 is to autonomously plan its motion when in the fully autonomous operating mode. The vehicle computing system 110 can access the memory when implementing an operating mode.

The operating mode of the vehicle 105 can be adjusted in a variety of manners. For example, the operating mode of the vehicle 105 can be selected remotely, off-board the vehicle 105. For example, a remote computing system (e.g., of a vehicle provider and/or service entity associated with the vehicle 105) can communicate data to the vehicle 105 instructing the vehicle 105 to enter into, exit from, maintain, etc. an operating mode. By way of example, such data can instruct the vehicle 105 to enter into the fully autonomous operating mode.

In some implementations, the operating mode of the vehicle 105 can be set onboard and/or near the vehicle 105. For example, the vehicle computing system 110 can automatically determine when and where the vehicle 105 is to enter, change, maintain, etc. a particular operating mode (e.g., without user input). Additionally, or alternatively, the operating mode of the vehicle 105 can be manually selected via one or more interfaces located onboard the vehicle 105 (e.g., key switch, button, etc.) and/or associated with a computing device proximate to the vehicle 105 (e.g., a tablet operated by authorized personnel located near the vehicle 105). In some implementations, the operating mode of the vehicle 105 can be adjusted by manipulating a series of interfaces in a particular order to cause the vehicle 105 to enter into a particular operating mode.

The vehicle computing system 110 can include one or more computing devices located onboard the vehicle 105. For example, the computing device(s) can be located on and/or within the vehicle 105. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 105 (e.g., its computing system, one or more processors, etc.) to perform operations and functions, such as those described herein for controlling an autonomous vehicle, communicating with other computing systems, etc.

The vehicle 105 can include a communications system 115 configured to allow the vehicle computing system 110 (and its computing device(s)) to communicate with other computing devices. The communications system 115 can include any suitable components for interfacing with one or more network(s) 120, including, for example, transmitters, receivers, ports, controllers, antennas, and/or other suitable components that can help facilitate communication. In some implementations, the communications system 115 can include a plurality of components (e.g., antennas, transmitters, and/or receivers) that allow it to implement and utilize multiple-input, multiple-output (MIMO) technology and communication techniques.

The vehicle computing system 110 can use the communications system 115 to communicate with one or more computing device(s) that are remote from the vehicle 105 over one or more networks 120 (e.g., via one or more wireless signal connections). The network(s) 120 can exchange (send or receive) signals (e.g., electronic signals), data (e.g., data from a computing device), and/or other information and include any combination of various wired (e.g., twisted pair cable) and/or wireless communication mechanisms (e.g., cellular, wireless, satellite, microwave, and radio frequency) and/or any desired network topology (or topologies). For example, the network(s) 120 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communication network (or combination thereof) for transmitting data to and/or from the vehicle 105 and/or among computing systems.

In some implementations, the communications system 115 can also be configured to enable the vehicle 105 to communicate with and/or provide and/or receive data and/or signals from a remote computing device associated with a user 125 and/or an item (e.g., an item to be picked-up for a courier service). For example, the communications system 115 can allow the vehicle 105 to locate and/or exchange communications with a user device 130 of a user 125. In some implementations, the communications system 115 can allow communication among one or more of the system(s) on-board the vehicle 105.

As shown in FIG. 3, the vehicle 105 can include one or more sensors 135, an autonomy computing system 140, a vehicle interface 145, one or more vehicle control systems 150, and other systems, as described herein. One or more of these systems can be configured to communicate with one another via one or more communication channels. The communication channel(s) can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel(s).

The sensor(s) 135 can be configured to acquire sensor data 155. The sensor(s) 135 can be external sensors configured to acquire external sensor data. This can include sensor data associated with the surrounding environment of the vehicle 105. The surrounding environment of the vehicle 105 can include/be represented in the field of view of the sensor(s) 135. For instance, the sensor(s) 135 can acquire image and/or other data of the environment outside of the vehicle 105 and within a range and/or field of view of one or more of the sensor(s) 135. The sensor(s) 135 can include one or more Light Detection and Ranging (LIDAR) systems, one or more Radio Detection and Ranging (RADAR) systems, one or more cameras (e.g., visible spectrum cameras, infrared cameras, etc.), one or more motion sensors, one or more audio sensors (e.g., microphones, etc.), and/or other types of imaging capture devices and/or sensors. The one or more sensors can be located on various parts of the vehicle 105 including a front side, rear side, left side, right side, top, and/or bottom of the vehicle 105. The sensor data 155 can include image data (e.g., 2D camera data, video data, etc.), RADAR data, LIDAR data (e.g., 3D point cloud data, etc.), audio data, and/or other types of data. The vehicle 105 can also include other sensors configured to acquire data associated with the vehicle 105. For example, the vehicle 105 can include inertial measurement unit(s), wheel odometry devices, and/or other sensors.

In some implementations, the sensor(s) 135 can include one or more internal sensors. The internal sensor(s) can be configured to acquire sensor data 155 associated with the interior of the vehicle 105. For example, the internal sensor(s) can include one or more cameras, one or more infrared sensors, one or more motion sensors, one or more weight sensors (e.g., in a seat, in a trunk, etc.), and/or other types of sensors. The sensor data 155 acquired via the internal sensor(s) can include, for example, image data indicative of a position of a passenger or item located within the interior (e.g., cabin, trunk, etc.) of the vehicle 105. This information can be used, for example, to ensure the safety of the passenger, to prevent an item from being left by a passenger, confirm the cleanliness of the vehicle 105, remotely assist a passenger, etc.

In some implementations, the sensor data 155 can be indicative of one or more objects within the surrounding environment of the vehicle 105. The object(s) can include, for example, vehicles, pedestrians, bicycles, and/or other objects. The object(s) can be located in front of, to the rear of, to the side of, above, below the vehicle 105, etc. The sensor data 155 can be indicative of locations associated with the object(s) within the surrounding environment of the vehicle 105 at one or more times. The object(s) can be static objects (e.g., not in motion) and/or dynamic objects/actors (e.g., in motion or likely to be in motion) in the vehicle's environment. The sensor(s) 135 can provide the sensor data 155 to the autonomy computing system 140.

In addition to the sensor data 155, the autonomy computing system 140 can obtain map data 160. The map data 160 can provide detailed information about the surrounding environment of the vehicle 105 and/or the geographic area in which the vehicle was, is, and/or will be located. For example, the map data 160 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, and/or other traffic control devices); obstruction information (e.g., temporary or permanent blockages, etc.); event data (e.g., road closures/traffic rule alterations due to parades, concerts, sporting events, etc.); nominal vehicle path data (e.g., indicate of an ideal vehicle path such as along the center of a certain lane, etc.); and/or any other map data that provides information that assists the vehicle computing system 110 in processing, analyzing, and perceiving its surrounding environment and its relationship thereto. In some implementations, the map data 160 can include high definition map data. In some implementations, the map data 160 can include sparse map data indicative of a limited number of environmental features (e.g., lane boundaries, etc.). In some implementations, the map data can be limited to geographic area(s) and/or operating domains in which the vehicle 105 (or autonomous vehicles generally) may travel (e.g., due to legal/regulatory constraints, autonomy capabilities, and/or other factors).

The vehicle 105 can include a positioning system 165. The positioning system 165 can determine a current position of the vehicle 105. This can help the vehicle 105 localize itself within its environment. The positioning system 165 can be any device or circuitry for analyzing the position of the vehicle 105. For example, the positioning system 165 can determine position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the vehicle 105 can be used by various systems of the vehicle computing system 110 and/or provided to a remote computing system. For example, the map data 160 can provide the vehicle 105 relative positions of the elements of a surrounding environment of the vehicle 105. The vehicle 105 can identify its position within the surrounding environment (e.g., across six axes, etc.) based at least in part on the map data 160. For example, the vehicle computing system 110 can process the sensor data 155 (e.g., LIDAR data, camera data, etc.) to match it to a map of the surrounding environment to get an understanding of the vehicle's position within that environment. Data indicative of the vehicle's position can be stored, communicated to, and/or otherwise obtained by the autonomy computing system 140.

The autonomy computing system 140 can perform various functions for autonomously operating the vehicle 105. For example, the autonomy computing system 140 can perform the following functions: perception 170A, prediction 170B, and motion planning 170C. For example, the autonomy computing system 130 can obtain the sensor data 155 via the sensor(s) 135, process the sensor data 155 (and/or other data) to perceive its surrounding environment, predict the motion of objects within the surrounding environment, and generate an appropriate motion plan through such surrounding environment. In some implementations, these autonomy functions can be performed by one or more sub-systems such as, for example, a perception system, a prediction system, a motion planning system, and/or other systems that cooperate to perceive the surrounding environment of the vehicle 105 and determine a motion plan for controlling the motion of the vehicle 105 accordingly. In some implementations, one or more of the perception, prediction, and/or motion planning functions 170A, 170B, 170C can be performed by (and/or combined into) the same system and/or via shared computing resources. In some implementations, one or more of these functions can be performed via difference sub-systems. As further described herein, the autonomy computing system 140 can communicate with the one or more vehicle control systems 150 to operate the vehicle 105 according to the motion plan (e.g., via the vehicle interface 145, etc.).

The vehicle computing system 110 (e.g., the autonomy computing system 140) can identify one or more objects that within the surrounding environment of the vehicle 105 based at least in part on the sensor data 135 and/or the map data 160. The objects perceived within the surrounding environment can be those within the field of view of the sensor(s) 135 and/or predicted to be occluded from the sensor(s) 135. This can include object(s) not in motion or not predicted to move (static objects) and/or object(s) in motion or predicted to be in motion (dynamic objects/actors). The vehicle computing system 110 (e.g., performing the perception function 170A, using a perception system, etc.) can process the sensor data 155, the map data 160, etc. to obtain perception data 175A. The vehicle computing system 110 can generate perception data 175A that is indicative of one or more states (e.g., current and/or past state(s)) of one or more objects that are within a surrounding environment of the vehicle 105. For example, the perception data 175A for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape, object highlighting, etc.); class (e.g., pedestrian class vs. vehicle class vs. bicycle class, etc.), the uncertainties associated therewith, and/or other state information. The vehicle computing system 110 can utilize one or more algorithms and/or machine-learned model(s) that are configured to identify object(s) based at least in part on the sensor data 155. This can include, for example, one or more neural networks trained to identify object(s) within the surrounding environment of the vehicle 105 and the state data associated therewith. The perception data 175A can be utilized for the prediction function 175B of the autonomy computing system 140.

The vehicle computing system 110 can be configured to predict a motion of the object(s) within the surrounding environment of the vehicle 105. For instance, the vehicle computing system 110 can generate prediction data 175B associated with such object(s). The prediction data 175B can be indicative of one or more predicted future locations of each respective object. For example, the prediction system 175B can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 175B can be indicative of the speed and/or acceleration at which the respective object is predicted to travel along its associated predicted motion trajectory. The vehicle computing system 110 can utilize one or more algorithms and/or machine-learned model(s) that are configured to predict the future motion of object(s) based at least in part on the sensor data 155, the perception data 175A, map data 160, and/or other data. For example, the vehicle computing system 110 can perform any of the methods or probabilistic object motion prediction models described herein to generate the prediction data 175B. This can include, for example, one or more neural networks trained to predict the motion of the object(s) within the surrounding environment of the vehicle 105 based at least in part on the past and/or current state(s) of those objects as well as the environment in which the objects are located (e.g., the lane boundary in which it is travelling, etc.). The prediction data 175B can be utilized for the motion planning function 170C of the autonomy computing system 140.

The vehicle computing system 110 can determine a motion plan for the vehicle 105 based at least in part on the perception data 175A, the prediction data 175B, and/or other data. For example, the vehicle computing system 110 can generate motion planning data 175C indicative of a motion plan. The motion plan can include vehicle actions (e.g., speed(s), acceleration(s), other actions, etc.) with respect to one or more of the objects within the surrounding environment of the vehicle 105 as well as the objects' predicted movements. The motion plan can include one or more vehicle motion trajectories that indicate a path for the vehicle 105 to follow. A vehicle motion trajectory can be of a certain length and/or time range. A vehicle motion trajectory can be defined by one or more way points (with associated coordinates). The planned vehicle motion trajectories can indicate the path the vehicle 105 is to follow as it traverses a route from one location to another. Thus, the vehicle computing system 110 can take into account a route/route data when performing the motion planning function 170C.

The motion planning system 180 can implement an optimization algorithm, machine-learned model, etc. that considers cost data associated with a vehicle action as well as other objective functions (e.g., cost functions based on speed limits, traffic lights, etc.), if any, to determine optimized variables that make up the motion plan. The vehicle computing system 110 can determine that the vehicle 105 can perform a certain action (e.g., pass an object, etc.) without increasing the potential risk to the vehicle 105 and/or violating any traffic laws (e.g., speed limits, lane boundaries, signage, etc.). For instance, the vehicle computing system 110 can evaluate the predicted motion trajectories of one or more objects during its cost data analysis to help determine an optimized vehicle trajectory through the surrounding environment. The motion planning system 180 can generate cost data associated with such trajectories. In some implementations, one or more of the predicted motion trajectories and/or perceived objects may not ultimately change the motion of the vehicle 105 (e.g., due to an overriding factor). In some implementations, the motion plan may define the vehicle's motion such that the vehicle 105 avoids the object(s), reduces speed to give more leeway to one or more of the object(s), proceeds cautiously, performs a stopping action, passes an object, queues behind/in front of an object, etc.

The vehicle computing system 110 can be configured to continuously update the vehicle's motion plan and a corresponding planned vehicle motion trajectories. For example, in some implementations, the vehicle computing system 110 can generate new motion planning data 175C/motion plan(s) for the vehicle 105 (e.g., multiple times per second, etc.). Each new motion plan can describe a motion of the vehicle 105 over the next planning period (e.g., next several seconds, etc.). Moreover, a new motion plan may include a new planned vehicle motion trajectory. Thus, in some implementations, the vehicle computing system 110 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 105.

The vehicle computing system 110 can cause the vehicle 105 to initiate a motion control in accordance with at least a portion of the motion planning data 175C. A motion control can be an operation, action, etc. that is associated with controlling the motion of the vehicle 105. For instance, the motion planning data 175C can be provided to the vehicle control system(s) 150 of the vehicle 105. The vehicle control system(s) 150 can be associated with a vehicle interface 145 that is configured to implement a motion plan. The vehicle interface 145 can serve as an interface/conduit between the autonomy computing system 140 and the vehicle control systems 150 of the vehicle 105 and any electrical/mechanical controllers associated therewith. The vehicle interface 145 can, for example, translate a motion plan into instructions for the appropriate vehicle control component (e.g., acceleration control, brake control, steering control, etc.). By way of example, the vehicle interface 145 can translate a determined motion plan into instructions to adjust the steering of the vehicle 105 "X" degrees, apply a certain magnitude of braking force, increase/decrease speed, etc. The vehicle interface 145 can help facilitate the responsible vehicle control (e.g., braking control system, steering control system, acceleration control system, etc.) to execute the instructions and implement a motion plan (e.g., by sending control signal(s), making the translated plan available, etc.). This can allow the vehicle 105 to autonomously travel within the vehicle's surrounding environment.

The vehicle computing system 110 can store other types of data. For example, an indication, record, and/or other data indicative of the state of the vehicle (e.g., its location, motion trajectory, health information, etc.), the state of one or more users (e.g., passengers, operators, etc.) of the vehicle, and/or the state of an environment including one or more objects (e.g., the physical dimensions and/or appearance of the one or more objects, locations, predicted motion, etc.) can be stored locally in one or more memory devices of the vehicle 105. Additionally, the vehicle 105 can communicate data indicative of the state of the vehicle, the state of one or more passengers of the vehicle, and/or the state of an environment to a computing system that is remote from the vehicle 105, which can store such information in one or more memories remote from the vehicle 105. Moreover, the vehicle 105 can provide any of the data created and/or store onboard the vehicle 105 to another vehicle.

The vehicle computing system 110 can include the one or more vehicle user devices 180. For example, the vehicle computing system 110 can include one or more user devices with one or more display devices located onboard the vehicle 15. A display device (e.g., screen of a tablet, laptop, and/or smartphone) can be viewable by a user of the vehicle 105 that is located in the front of the vehicle 105 (e.g., driver's seat, front passenger seat). Additionally, or alternatively, a display device can be viewable by a user of the vehicle 105 that is located in the rear of the vehicle 105 (e.g., a back passenger seat). The user device(s) associated with the display devices can be any type of user device such as, for example, a table, mobile phone, laptop, etc. The vehicle user device(s) 180 can be configured to function as human-machine interfaces. For example, the vehicle user device(s) 180 can be configured to obtain user input, which can then be utilized by the vehicle computing system 110 and/or another computing system (e.g., a remote computing system, etc.). For example, a user (e.g., a passenger for transportation service, a vehicle operator, etc.) of the vehicle 105 can provide user input to adjust a destination location of the vehicle 105. The vehicle computing system 110 and/or another computing system can update the destination location of the vehicle 105 and the route associated therewith to reflect the change indicated by the user input.

The vehicle 105 can be configured to perform vehicle services for one or a plurality of different service entities 185. A vehicle 105 can perform a vehicle service by, for example and as further described herein, travelling (e.g., traveling autonomously) to a location associated with a requested vehicle service, allowing user(s) and/or item(s) to board or otherwise enter the vehicle 105, transporting the user(s) and/or item(s), allowing the user(s) and/or item(s) to deboard or otherwise exit the vehicle 105, etc. In this way, the vehicle 105 can provide the vehicle service(s) for a service entity to a user.

A service entity 185 can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of one or more vehicle services to one or more users. For example, a service entity can offer vehicle service(s) to users via one or more software applications (e.g., that are downloaded onto a user computing device), via a website, and/or via other types of interfaces that allow a user to request a vehicle service. As described herein, the vehicle services can include transportation services (e.g., by which a vehicle transports user(s) from one location to another), delivery services (e.g., by which a vehicle transports/delivers item(s) to a requested destination location), courier services (e.g., by which a vehicle retrieves item(s) from a requested origin location and transports/delivers the item to a requested destination location), and/or other types of services. The vehicle services can be wholly performed by the vehicle 105 (e.g., travelling from the user/item origin to the ultimate destination, etc.) or performed by one or more vehicles and/or modes of transportation (e.g., transferring the user/item at intermediate transfer points, etc.).

An operations computing system 190A of the service entity 185 can help to coordinate the performance of vehicle services by autonomous vehicles. The operations computing system 190A can include and/or implement one or more service platforms of the service entity. The operations computing system 190 A can include one or more computing devices. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the operations computing system 190 (e.g., its one or more processors, etc.) to perform operations and functions, such as those described herein matching users and vehicles/vehicle fleets, deploying vehicles, facilitating the provision of vehicle services via autonomous vehicles, etc.

A user 125 can request a vehicle service from a service entity 185. For example, the user 125 can provide user input to a user device 130 to request a vehicle service (e.g., via a user interface associated with a mobile software application of the service entity 185 running on the user device 130). The user device 130 can communicate data indicative of a vehicle service request 195 to the operations computing system 190A associated with the service entity 185 (and/or another associated computing system that can then communicate data to the operations computing system 190A). The vehicle service request 195 can be associated with a user. The associated user can be the one that submits the vehicle service request (e.g., via an application on the user device 130). In some implementations, the user may not be the user that submits the vehicle service request. The vehicle service request can be indicative of the user. For example, the vehicle service request can include an identifier associated with the user and/or the user's profile/account with the service entity 185. The vehicle service request 195 can be generated in a manner that avoids the use of personally identifiable information and/or allows the user to control the types of information included in the vehicle service request 195. The vehicle service request 195 can also be generated, communicated, stored, etc. in a secure manner to protect information.

The vehicle service request 195 can indicate various types of information. For example, the vehicle service request 194 can indicate the type of vehicle service that is desired (e.g., a transportation service, a delivery service, a courier service, etc.), one or more locations (e.g., an origin location, a destination location, etc.), timing constraints (e.g., pick-up time, drop-off time, deadlines, etc.), and/or geographic constraints (e.g., to stay within a certain area, etc.). The service request 195 can indicate a type/size/class of vehicle such as, for example, a sedan, an SUV, luxury vehicle, standard vehicle, etc. The service request 195 can indicate a product of the service entity 185. For example, the service request 195 can indicate that the user is requesting a transportation pool product by which the user would potentially share the vehicle (and costs) with other users/items. In some implementations, the service request 195 can explicitly request for the vehicle service to be provided by an autonomous vehicle or a human-driven vehicle. In some implementations, the service request 195 can indicate a number of users that will be riding in the vehicle/utilizing the vehicle service. In some implementations, the service request 195 can indicate preferences/special accommodations of an associated user (e.g., music preferences, climate preferences, wheelchair accessibility, etc.) and/or other information.

The operations computing system 190A of the service entity 185 can process the data indicative of the vehicle service request 195 and generate a vehicle service assignment that is associated with the vehicle service request. The operations computing system can identify one or more vehicles that may be able to perform the requested vehicle services to the user 195. The operations computing system 190A can identify which modes of transportation are available to a user for the requested vehicle service (e.g., light electric vehicles, human-drive vehicles, autonomous vehicles, aerial vehicle, etc.) and/or the number of transportation modes/legs of a potential itinerary of the user for completing the vehicle service (e.g., single or plurality of modes, single or plurality of legs, etc.). For example, the operations computing system 190A can determined which autonomous vehicle(s) are online with the service entity 185 (e.g., available for a vehicle service assignment, addressing a vehicle service assignment, etc.) to help identify which autonomous vehicle(s) would be able to provide the vehicle service.

The operations computing system 190A and/or the vehicle computing system 110 can communicate with one or more other computing systems 190B that are remote from the vehicle 105. This can include, for example, computing systems associated with government functions (e.g., emergency services, regulatory bodies, etc.), computing systems associated with vehicle providers other than the service entity, computing systems of other vehicles (e.g., other autonomous vehicles, aerial vehicles, etc.). Communication with the other computing systems 190B can occur via the network(s) 120.

Example Methods

Figure 4:
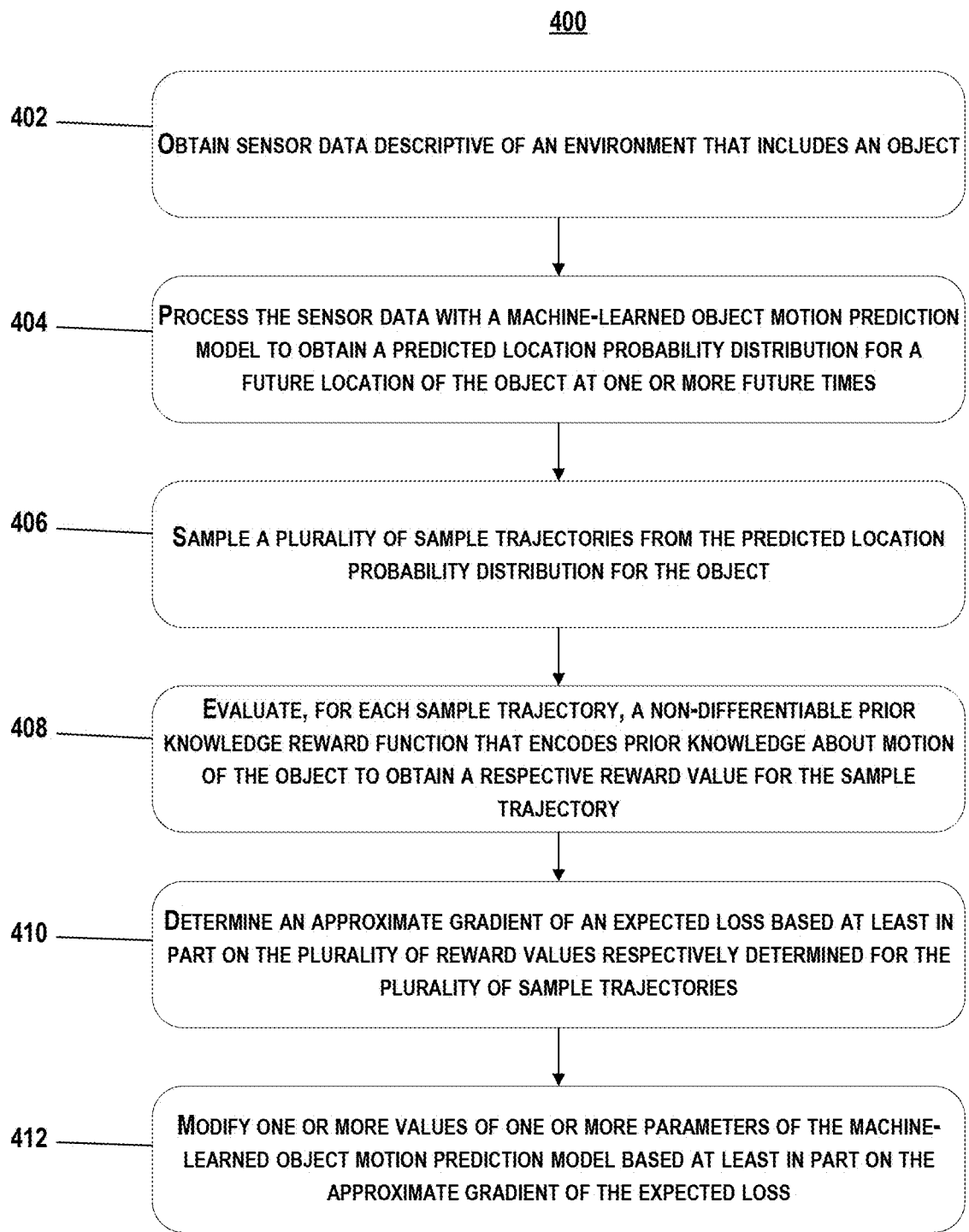
FIG. 4 depicts a flow chart diagram of an example method for training probabilistic object motion prediction models using non-differentiable prior knowledge according to example embodiments of the present disclosure.

FIG. 4 depicts a flow diagram of an example method 400 for training probabilistic object motion prediction models using non-differentiable prior knowledge according to example embodiments of the present disclosure. One or more portion(s) of the method 400 can be implemented by one or more computing devices such as, for example, the computing devices described in FIGS. 3, 5, and/or 6. Moreover, one or more portion(s) of the method 400 can be implemented as an algorithm on the hardware components of the device(s) described herein (e.g., as in FIGS. 3, 5, and/or 6). FIG. 4 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (402), the method 400 can include obtaining, by a computing system, sensor data descriptive of an environment that includes an object. In some implementations, the sensor data descriptive of the environment can be or include real world sensor data collected by sensors associated with a vehicle while the vehicle operated in the real world.

At (404), the method 400 can include processing, by the computing system, the sensor data with a machine-learned object motion prediction model to obtain a predicted location probability distribution for a future location of the object at one or more future times.

In some implementations, the one or more future times can be a plurality of future times.

In some implementations, the machine-learned object motion prediction model can be or include a spatially-aware graph neural network combined with a multi-layer perceptron parameterized as a mixture of Gaussians.

At (406), the method 400 can include sampling, by the computing system, a plurality of sample trajectories from the predicted location probability distribution for the object.

At (408), the method 400 can include evaluating, by the computing system and for each sample trajectory, a non-differentiable prior knowledge reward function that encodes prior knowledge about motion of the object to obtain a respective reward value for the sample trajectory.

In some implementations, the non-differentiable prior knowledge reward function compares the sample trajectory with a ground truth data associated with a real world object captured in the real world sensor data.

In some implementations, the prior knowledge about motion of the object can be or include prior knowledge about lane geometry, road topology, or traffic rules within the environment.

In some implementations, evaluating, by the computing system and for each sample trajectory, the non-differentiable prior knowledge reward function includes determining, by the computing system, a reachable area for the object and evaluating, by the computing system and for each sample trajectory, the non-differentiable prior knowledge reward function based on the reachable area. For example, the reachable area can be defined by a set of one or more reachable lanes that are reachable from a current location of the object while observing traffic rules.

In some implementations, the non-differentiable prior knowledge reward function returns a positive reward when the sample trajectory stays within the reachable area; and the non-differentiable prior knowledge reward function returns a negative reward when the sample trajectory exits the reachable area.

In some implementations: the non-differentiable prior knowledge reward function returns a positive reward when the sample trajectory stays within the reachable area and a ground truth trajectory associated with the object stays within a ground truth reachable area; and the non-differentiable prior knowledge reward function returns a negative reward when the sample trajectory exits the reachable area and the ground truth trajectory associated with the object stays within the ground truth reachable area.

In some implementations, the traffic rules can be or include lane infraction rules that prohibit crossing a solid line or entering a lane having an opposite traffic flow direction.

In some implementations, the traffic rules can include adhering to a current traffic control state provided by a traffic control device.

In some implementations, evaluating, by the computing system and for each sample trajectory, the non-differentiable prior knowledge reward function can include determining, by the computing system and for each sample trajectory, whether the sample trajectory intersects with a route associated with an ego vehicle, wherein the reward value is a function of whether the sample trajectory intersects with the route.

In some implementations: the non-differentiable prior knowledge reward function returns a true positive reward value when the sample trajectory intersects the route and a ground truth trajectory associated with the object intersects the route; the non-differentiable prior knowledge reward function returns a false positive reward value when the sample trajectory intersects the route and the ground truth trajectory associated with the object does not intersect the route; the non-differentiable prior knowledge reward function returns a true negative reward value when the sample trajectory does not intersect the route and the ground truth trajectory associated with the object does not intersect the route; and the non-differentiable prior knowledge reward function returns a false positive reward value when the sample trajectory does not intersect the route and the ground truth trajectory associated with the object intersects the route.

In some implementations, the route associated with the ego vehicle can be or include a current motion plan for the ego vehicle.

At (410), the method 400 can include determining, by the computing system, an approximate gradient of an expected loss based at least in part on the plurality of reward values respectively determined for the plurality of sample trajectories.

In some implementations, determining, by the computing system, the approximate gradient of the expected loss based at least in part on the plurality of reward values respectively determined for the plurality of sample trajectories can include performing, by the computing system, a REINFORCE gradient estimation technique.

At (412), the method 400 can include modifying, by the computing system, one or more values of one or more parameters of the machine-learned object motion prediction model based at least in part on the approximate gradient of the expected loss.

In some implementations, modifying, by the computing system, the one or more values of the one or more parameters of the machine-learned object motion prediction model based at least in part on the approximate gradient of the expected loss can include modifying, by the computing system, the one or more values of the one or more parameters of the machine-learned object motion prediction model based at least in part on a heuristically chosen closest matching mode.

Example Means

Figure 5:
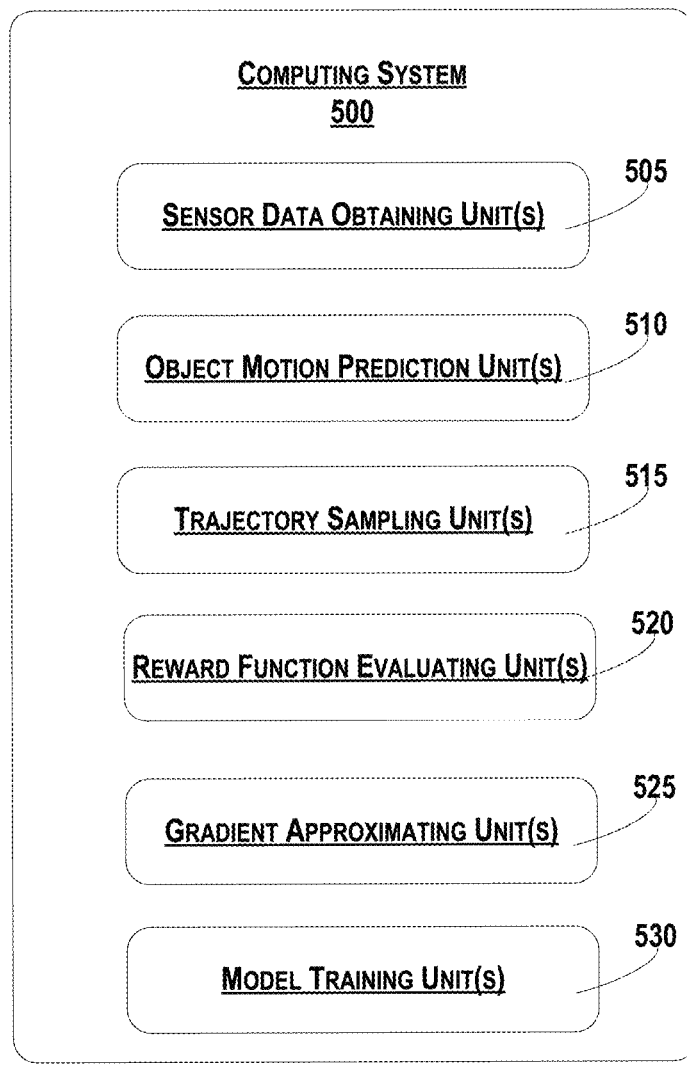
FIG. 5 depicts a block diagram of an example computing system according to example embodiments of the present disclosure.

Various means can be configured to perform the methods and processes described herein. FIG. 5 depicts example units associated with a computing system for performing operations and functions according to example embodiments of the present disclosure. As depicted, FIG. 5 depicts a computing system 500 that can include, but is not limited to, sensor data obtaining unit(s) 505; object motion prediction unit(s) 510; trajectory sampling unit(s) 515; reward function evaluating unit(s) 520; gradient approximating unit(s) 525; and/or model training unit(s) 530. In some implementations one or more units may be implemented separately. In some implementations, one or more units may be included in one or more other units.

In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein (including the claims).

In particular, the sensor data obtaining unit(s) 505 can be configured to obtain sensor data descriptive of an environment that includes an object. In some implementations, the sensor data descriptive of the environment can be or include real world sensor data collected by sensors associated with a vehicle while the vehicle operated in the real world.

The objection motion prediction unit(s) 510 can be configured to process the sensor data with a machine-learned object motion prediction model to obtain a predicted location probability distribution for a future location of the object at one or more future times. In some implementations, the one or more future times can be a plurality of future times. In some implementations, the machine-learned object motion prediction model can be or include a spatially-aware graph neural network combined with a multi-layer perceptron parameterized as a mixture of Gaussians.

The trajectory sampling unit(s) 515 can be configured to sample a plurality of sample trajectories from the predicted location probability distribution for the object.

The reward function evaluating unit(s) 520 can be configured to evaluate, for each sample trajectory, a non-differentiable prior knowledge reward function that encodes prior knowledge about motion of the object to obtain a respective reward value for the sample trajectory.

In some implementations, the non-differentiable prior knowledge reward function compares the sample trajectory with a ground truth data associated with a real world object captured in the real world sensor data.

In some implementations, the prior knowledge about motion of the object can be or include prior knowledge about lane geometry, road topology, or traffic rules within the environment.

In some implementations, evaluating, for each sample trajectory, the non-differentiable prior knowledge reward function includes determining a reachable area for the object and evaluating, for each sample trajectory, the non-differentiable prior knowledge reward function based on the reachable area. For example, the reachable area can be defined by a set of one or more reachable lanes that are reachable from a current location of the object while observing traffic rules.

In some implementations, the non-differentiable prior knowledge reward function returns a positive reward when the sample trajectory stays within the reachable area; and the non-differentiable prior knowledge reward function returns a negative reward when the sample trajectory exits the reachable area.

In some implementations: the non-differentiable prior knowledge reward function returns a positive reward when the sample trajectory stays within the reachable area and a ground truth trajectory associated with the object stays within a ground truth reachable area; and the non-differentiable prior knowledge reward function returns a negative reward when the sample trajectory exits the reachable area and the ground truth trajectory associated with the object stays within the ground truth reachable area.

In some implementations, the traffic rules can be or include lane infraction rules that prohibit crossing a solid line or entering a lane having an opposite traffic flow direction.

In some implementations, the traffic rules can include adhering to a current traffic control state provided by a traffic control device.

In some implementations, evaluating, for each sample trajectory, the non-differentiable prior knowledge reward function can include determining, for each sample trajectory, whether the sample trajectory intersects with a route associated with an ego vehicle, wherein the reward value is a function of whether the sample trajectory intersects with the route.

In some implementations: the non-differentiable prior knowledge reward function returns a true positive reward value when the sample trajectory intersects the route and a ground truth trajectory associated with the object intersects the route; the non-differentiable prior knowledge reward function returns a false positive reward value when the sample trajectory intersects the route and the ground truth trajectory associated with the object does not intersect the route; the non-differentiable prior knowledge reward function returns a true negative reward value when the sample trajectory does not intersect the route and the ground truth trajectory associated with the object does not intersect the route; and the non-differentiable prior knowledge reward function returns a false positive reward value when the sample trajectory does not intersect the route and the ground truth trajectory associated with the object intersects the route.

In some implementations, the route associated with the ego vehicle can be or include a current motion plan for the ego vehicle.

The gradient approximating unit(s) 525 can be configured to determine an approximate gradient of an expected loss based at least in part on the plurality of reward values respectively determined for the plurality of sample trajectories. In some implementations, determining the approximate gradient of the expected loss based at least in part on the plurality of reward values respectively determined for the plurality of sample trajectories can include performing a REINFORCE gradient estimation technique.

The model training unit(s) 530 can be configured to modify one or more values of one or more parameters of the machine-learned object motion prediction model based at least in part on the approximate gradient of the expected loss. In some implementations, modifying the one or more values of the one or more parameters of the machine-learned object motion prediction model based at least in part on the approximate gradient of the expected loss can include modifying the one or more values of the one or more parameters of the machine-learned object motion prediction model based at least in part on a heuristically chosen closest matching mode.

Example Computing Systems

Figure 6:
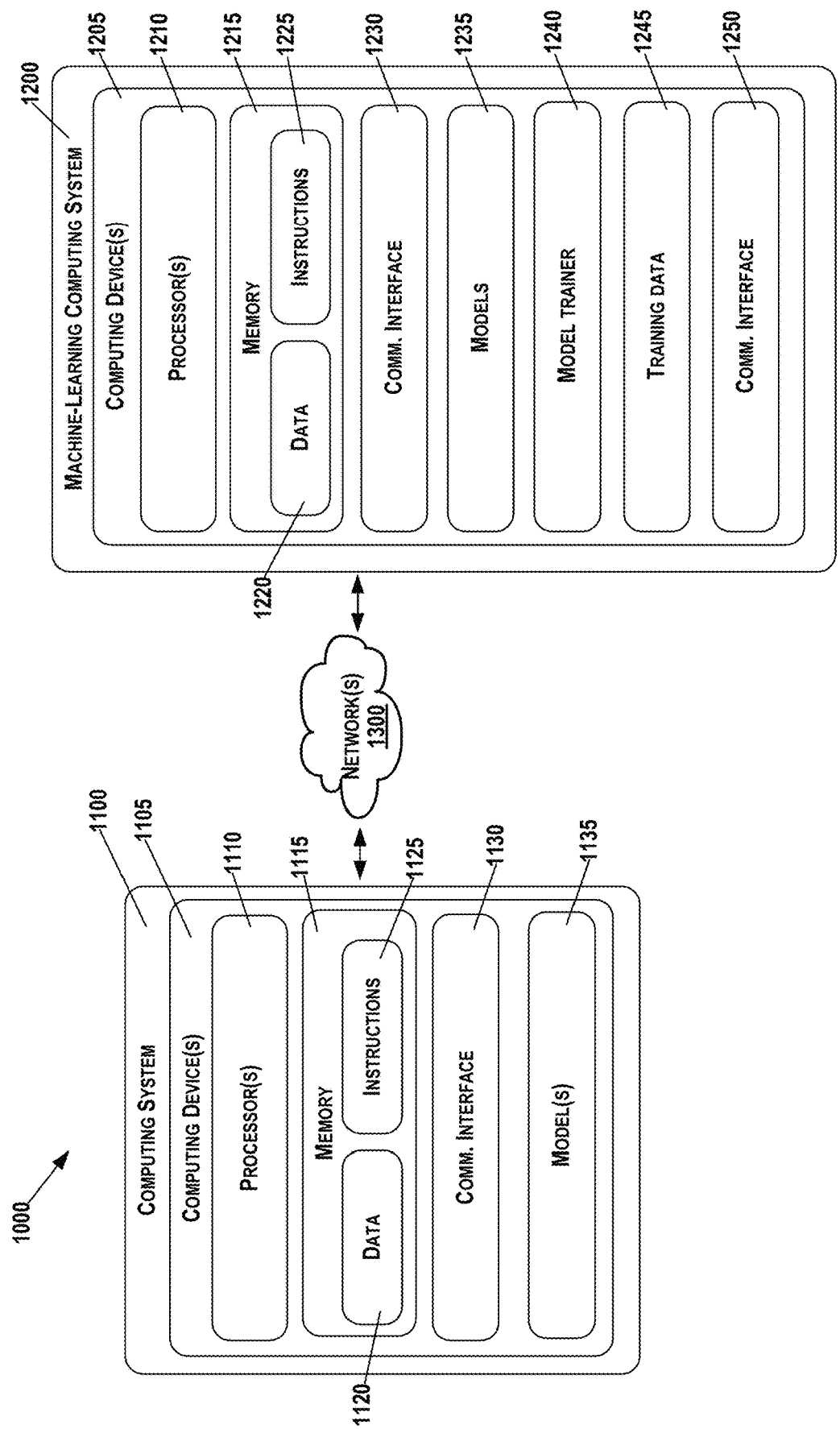
FIG. 6 depicts a block diagram of an example computing system according to example embodiments of the present disclosure.

FIG. 6 depicts a block diagram of an example computing system 1000 according to example embodiments of the present disclosure. The example system 1000 includes a computing system 1100 and a machine learning computing system 1200 that are communicatively coupled over one or more networks 1300.

In some implementations, the computing system 1105 can perform training of machine learning models and/or predict motion for objects. In some implementations, the computing system 1105 can be included in an autonomous vehicle. For example, the computing system 1105 can be on-board the autonomous vehicle. In other implementations, the computing system 1105 is not located on-board the autonomous vehicle. For example, the computing system 1105 can operate offline to perform training or predict motion for objects. The computing system 1105 can include one or more distinct physical computing devices.

The computing system 1105 can include one or more processors 1110 and a memory 1115. The one or more processors 1110 can be any suitable processing device (e.g., a processor core, a microprocessor, an ASIC, a FPGA, a controller, a microcontroller, etc.) and can be one processor or a plurality of processors that are operatively connected. The memory 1115 can include one or more non-transitory computer-readable storage media, such as RAM, ROM, EEPROM, EPROM, one or more memory devices, flash memory devices, etc., and combinations thereof.

The memory 1115 can store information that can be accessed by the one or more processors 1110. For instance, the memory 1115 (e.g., one or more non-transitory computer-readable storage mediums, memory devices) can store data 1120 that can be obtained, received, accessed, written, manipulated, created, and/or stored. The data 1120 can include, for instance, include examples as described herein. In some implementations, the computing system 1100 can obtain data from one or more memory device(s) that are remote from the computing system 1100.

The memory 1115 can also store computer-readable instructions 1125 that can be executed by the one or more processors 1120. The instructions 1125 can be software written in any suitable programming language or can be implemented in hardware. Additionally, or alternatively, the instructions 1125 can be executed in logically and/or virtually separate threads on processor(s) 1110.

For example, the memory 1115 can store instructions 1125 that when executed by the one or more processors 1110 cause the one or more processors 1110 (the computing system) to perform any of the operations and/or functions described herein, including, for example, insert functions.

According to an aspect of the present disclosure, the computing system 1105 can store or include one or more machine-learned models 1135. As examples, the machine-learned models 1135 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), convolutional neural networks, or other forms of neural networks.

In some implementations, the computing system 1100 can receive the one or more machine-learned models 1135 from the machine learning computing system 1200 over network(s) 1300 and can store the one or more machine-learned models 1135 in the memory 1115. The computing system 1100 can then use or otherwise implement the one or more machine-learned models 1135 (e.g., by processor(s) 1110). In particular, the computing system 1100 can implement the machine learned model(s) 1135 to predict motion of objects.

The machine learning computing system 1200 can include one or more computing devices 1205. The machine learning computing system 1200 can include one or more processors 1210 and a memory 1215. The one or more processors 1210 can be any suitable processing device (e.g., a processor core, a microprocessor, an ASIC, a FPGA, a controller, a microcontroller, etc.) and can be one processor or a plurality of processors that are operatively connected. The memory 1215 can include one or more non-transitory computer-readable storage media, such as RAM, ROM, EEPROM, EPROM, one or more memory devices, flash memory devices, etc., and combinations thereof.

The memory 1215 can store information that can be accessed by the one or more processors 1210. For instance, the memory 1215 (e.g., one or more non-transitory computer-readable storage mediums, memory devices) can store data 1220 that can be obtained, received, accessed, written, manipulated, created, and/or stored. The data 1220 can include, for instance, include examples as described herein. In some implementations, the machine learning computing system 1200 can obtain data from one or more memory device(s) that are remote from the machine learning computing system 1200.

The memory 1210 can also store computer-readable instructions 1225 that can be executed by the one or more processors 1210. The instructions 1225 can be software written in any suitable programming language or can be implemented in hardware. Additionally, or alternatively, the instructions 1225 can be executed in logically and/or virtually separate threads on processor(s) 1210.

For example, the memory 1215 can store instructions 1225 that when executed by the one or more processors 1210 cause the one or more processors 1210 (the computing system) to perform any of the operations and/or functions described herein, including, for example, insert functions.

In some implementations, the machine learning computing system 1200 includes one or more server computing devices. If the machine learning computing system 1200 includes multiple server computing devices, such server computing devices can operate according to various computing architectures, including, for example, sequential computing architectures, parallel computing architectures, or some combination thereof.

In addition or alternatively to the model(s) 1235 at the computing system 1100, the machine learning computing system 1200 can include one or more machine-learned models 1235. As examples, the machine-learned models 1235 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), convolutional neural networks, or other forms of neural networks.

As an example, the machine learning computing system 1200 can communicate with the computing system 1100 according to a client-server relationship. For example, the machine learning computing system 1200 can implement the machine-learned models 1235 to provide a web service to the computing system 1100. For example, the web service can provide training services and/or motion prediction services.

Thus, machine-learned models 1135 can located and used at the computing system 1100 and/or machine-learned models 1235 can be located and used at the machine learning computing system 1200.

In some implementations, the machine learning computing system 1200 and/or the computing system 1100 can train the machine-learned models 1135 and/or 1140 through use of a model trainer 1240. The model trainer 1240 can train the machine-learned models 1135 and/or 1240 using one or more training or learning algorithms. One example training technique is backwards propagation of errors. In some implementations, the model trainer 1240 can perform supervised training techniques using a set of labeled training data. In other implementations, the model trainer 1240 can perform unsupervised training techniques using a set of unlabeled training data. The model trainer 1240 can perform a number of generalization techniques to improve the generalization capability of the models being trained. Generalization techniques include weight decays, dropouts, or other techniques.

In particular, the model trainer 1240 can train a machine-learned model 1135 and/or 1140 based on a set of training data 1245. The training data 1245 can include, for example, real world sensor data and associated ground truth data such as ground truth observed trajectories. The model trainer 1240 can be implemented in hardware, firmware, and/or software controlling one or more processors.

The computing system 1100 and the machine learning computing system 1200 can each include a communication interface 1130 and 1250, respectively. The communication interfaces 1130/1250 can used to communicate with one or more systems or devices, including systems or devices that are remotely located from the computing system 1100 and the machine learning computing system 1200. A communication interface 1130/1250 can include any circuits, components, software, etc. for communicating with one or more networks (e.g., 1300). In some implementations, a communication interface 1130/1250 can include, for example, one or more of a communications controller, receiver, transceiver, transmitter, port, conductors, software and/or hardware for communicating data.

The network(s) 1300 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 1300 can be accomplished, for instance, via a network interface using any type of protocol, protection scheme, encoding, format, packaging, etc.

FIG. 6 illustrates one example computing system 1000 that can be used to implement the present disclosure. Other computing systems can be used as well. For example, in some implementations, the computing system 1100 can include the model trainer 1240 and the training dataset 1245. In such implementations, the machine-learned models 1240 can be both trained and used locally at the computing system 1100. As another example, in some implementations, the computing system 1100 is not connected to other computing systems.

In addition, components illustrated and/or discussed as being included in one of the computing systems 1100 or 1200 can instead be included in another of the computing systems 1100 or 1200. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

Additional Disclosure

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for autonomous vehicle motion control, the method comprising:
    obtaining sensor data for an environment comprising an object;
    processing the sensor data with a machine-learned object motion prediction model to obtain a predicted location probability distribution for a future location of the object at one or more future times, wherein the machine-learned object motion prediction model has been trained by performing a REINFORCE gradient estimation technique to determine an approximate gradient of an expected loss that is a function of a non-differentiable prior knowledge reward function that encodes prior knowledge about motion of the object;
    generating a vehicle trajectory based, at least in part, on the predicted location probability distribution for the future location of the object at the one or more future times; and
    controlling motion of an autonomous vehicle based on the generated vehicle trajectory.

2. The computer-implemented method of claim 1, wherein:
    the sensor data for the environment comprises real world sensor data collected by sensors associated with the autonomous vehicle while the autonomous vehicle is operating; and
    the non-differentiable prior knowledge reward function comprises a sample trajectory with ground truth data associated with the object.

3. The computer-implemented method of claim 1, wherein the prior knowledge about motion of the object comprises prior knowledge about lane geometry, road topology, or traffic rules within the environment.

4. The computer-implemented method of claim 1, wherein generating the vehicle trajectory based, at least in part, on the predicted location probability distribution for the future location of the object at the one or more future times comprises:
    generating a trajectory score for each of a plurality of sample trajectories based, at least in part, on the predicted location probability distribution for the future location of the object at the one or more future times; and
    selecting a sample trajectory from the plurality of sample trajectories based on the trajectory scores.

5. The computer-implemented method of claim 4, wherein generating the trajectory score for each of the plurality of sample trajectories based, at least in part, on the predicted location probability distribution for the future location of the object at the one or more future times comprises:

determining a reachable area for the object, wherein the reachable area is defined by a set of one or more reachable lanes that are reachable from a current location of the object while observing traffic rules; and generating the trajectory score for each of the plurality of sample trajectories based, at least in part, on the reachable area.

6. The computer-implemented method of claim 5, wherein:

the generated trajectory score is increased when the sample trajectory stays within the reachable area; and the generated trajectory score is decreased when the sample trajectory exits the reachable area.

7. The computer-implemented method of claim 5, wherein:

the generated trajectory score is increased when the sample trajectory stays within the reachable area and a ground truth trajectory associated with the object stays within a ground truth reachable area; and the generated trajectory score is decreased when the sample trajectory exits the reachable area and the ground truth trajectory associated with the object stays within the ground truth reachable area.

8. The computer-implemented method of claim 5, wherein the traffic rules comprise lane infraction rules that prohibit crossing a solid line or entering a lane having an opposite traffic flow direction.

9. The computer-implemented method of claim 5, wherein the traffic rules comprise adhering to a current traffic control state provided by a traffic control device.

10. The computer-implemented method of claim 4, wherein generating the trajectory score for each of the plurality of sample trajectories based, at least in part, on the predicted location probability distribution for the future location of the object at the one or more future times comprises:

determining, for each sample trajectory, whether the sample trajectory intersects with a route associated with an ego vehicle, wherein the trajectory score is generated based on whether the sample trajectory intersects with the route.

11. The computer-implemented method of claim 10, wherein the route associated with the ego vehicle comprises a current motion plan for the ego vehicle.

12. The computer-implemented method of claim 1, wherein the machine-learned object motion prediction model comprises one or more neural networks.

13. The computer-implemented method of claim 4, wherein the one or more future times comprise a plurality of future times.

14. The computer-implemented method of claim 1, wherein the machine-learned object motion prediction model comprises a spatially-aware graph neural network combined with a multi-layer perceptron parameterized as a mixture of Gaussians.

15. The computer-implemented method of claim 1, wherein the training of the machine-learned object motion prediction model comprises:

modifying one or more values of one or more parameters of the machine-learned object motion prediction model based at least in part on the approximate gradient of the expected loss.

16. The computer-implemented method of claim 15, wherein modifying the one or more values of the one or more parameters of the machine-learned object motion prediction model based at least in part on the approximate gradient of the expected loss comprises modifying the one or more values of the one or more parameters of the machine-learned object motion prediction model based at least in part on a heuristically chosen closest matching mode.

17. A computing system, comprising:

one or more processors; and one or more non-transitory computer-readable mediums that collectively store instructions that, when executed by the one or more processors, cause the computing system to perform operations, the operations comprising:

obtaining sensor data for an environment comprising an object;

processing the sensor data with a machine-learned object motion prediction model to obtain a predicted location probability distribution for a future location of the object at one or more future times, wherein the machine-learned object motion prediction model has been trained by performing a REINFORCE gradient estimation technique to determine an approximate gradient of an expected loss that is a function of a non-differentiable prior knowledge reward function that encodes prior knowledge about motion of the object;

generating a vehicle trajectory based, at least in part, on the predicted location probability distribution for the future location of the object at the one or more future times; and controlling motion of an autonomous vehicle based on the generated vehicle trajectory.

18. The computing system of claim 17, wherein:

the sensor data for the environment comprises real world sensor data collected by sensors associated with the autonomous vehicle while the autonomous vehicle is operating; and the non-differentiable prior knowledge reward function compares a sample trajectory with ground truth data associated with the object.

19. The computing system of claim 17, wherein the prior knowledge about motion of the object comprises prior knowledge about lane geometry, road topology, or traffic rules within the environment.

20. An autonomous vehicle computing system, comprising:

one or more processors; and one or more non-transitory computer-readable mediums that collectively store:

a machine-learned object motion prediction model configured to process sensor data descriptive of an environment comprising an object to generate a predicted location probability distribution for a future location of the object at one or more future times, wherein the machine-learned object motion prediction model has been trained by performing a REINFORCE gradient estimation technique to determine an approximate gradient of an expected loss that is a function of a non-differentiable prior knowledge reward function that encodes prior knowledge about motion of the object; and instructions that, when executed by the one or more processors, cause the computing system to perform operations, the operations comprising:

obtaining the sensor data descriptive of the environment comprising the object;

processing the sensor data with the machine-learned object motion prediction model to generate the predicted location probability distribution for the future location of the object at the one or more future times;
generating a vehicle trajectory based, at least in part, on the predicted location probability distribution for the future location of the object at the one or more future times; and
controlling motion of an autonomous vehicle based at least in part on the generated vehicle trajectory.

* * * * *